(12) United States Patent
Pratt (10) Patent No.: US 7,022,934 B1
(45) Date of Patent: Apr. 4, 2006

(54) CONNECTING ADAPTER FOR WELD ELECTRODE

(75) Inventor: Thomas Pratt, Anniston, AL (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 286 days.

(21) Appl. No.: 10/458,709

(22) Filed: Jun. 10, 2003

(51) Int. Cl.
B23K 11/30 (2006.01)

(52) U.S. Cl. .................. 219/119; 219/120; 285/92

(58) Field of Classification Search ........... 219/119, 219/120; 285/92, 333
See application file for complete search history.

(56) References Cited

U.S. PATENT DOCUMENTS

| | | | | |
|---|---|---|---|---|
| 1,096,205 A | * | 5/1914 | Taylor | 219/120 |
| 2,536,726 A | * | 1/1951 | Cornwall | 219/120 |
| 2,829,239 A | * | 4/1958 | Boretti | 219/120 |
| 3,694,010 A | | 9/1972 | Callahan, Jr. | 285/334.4 |
| 3,739,140 A | * | 6/1973 | Rotilio | 219/144 |
| 4,345,136 A | | 8/1982 | Nippert | 219/120 |
| 4,588,870 A | | 5/1986 | Nadkarni et al. | 219/119 |
| 4,756,465 A | | 7/1988 | Pranch et al. | 228/115 |
| 4,760,235 A | | 7/1988 | Flater | 219/119 |
| 5,021,627 A | * | 6/1991 | Bersch et al. | 219/119 |
| 5,126,528 A | | 6/1992 | Bush et al. | 219/119 |
| 5,349,153 A | | 9/1994 | Prucher | 219/120 |
| 5,387,774 A | | 2/1995 | Boyer et al. | 219/86.33 |
| 5,443,580 A | * | 8/1995 | Cotter | 285/179 |
| 5,542,714 A | * | 8/1996 | Messinger et al. | 285/136.1 |
| 5,611,945 A | | 3/1997 | Kuwabara et al. | 219/119 |
| 5,726,420 A | | 3/1998 | Lajoie | 219/137.61 |
| 6,011,237 A | | 1/2000 | Yang | 219/119 |
| 6,355,901 B1 | | 3/2002 | Nippert | 219/119 |
| 6,860,514 B1 | * | 3/2005 | Wentworth et al. | 285/92 |

FOREIGN PATENT DOCUMENTS

| | | | |
|---|---|---|---|
| JP | 1-210180 | * | 8/1989 |
| JP | 2003-311431 | * | 11/1993 |

* cited by examiner

Primary Examiner—Len Tran
(74) Attorney, Agent, or Firm—Standley Law Group LLP (57) ABSTRACT

An electrically and thermally conductive adapter for connecting a weld electrode to a tip holder portion of a welding device. The adapter has a first, threaded end, for removable engagement with a like-threaded receiving cavity in the tip holder. The threads may be of parallel configuration to minimize damage to the receiving cavity. The adapter has a second, preferably tapered end, for receiving a removable weld electrode. A passageway is preferably provided through the adapter for transporting cooling fluid to the electrode. An o-ring may be retained on the adapter and designed to engage with a groove in the receiving cavity in order to prevent leakage of cooling fluid from around the threads. The adapter is economical to manufacture and may be quickly and easily removed or installed to the tip holder. The adapter reduces damage to the tip holder commonly caused by the repeated changing of electrodes.

24 Claims, 7 Drawing Sheets (PRIOR ART)
FIG. 1a

CONNECTING ADAPTER FOR WELD ELECTRODE

BACKGROUND AND SUMMARY OF THE INVENTION

The present invention relates generally to a connecting adapter for connecting a weld electrode to a welding device, particularly a resistance welding device. More specifically, the present invention relates to a one-piece adapter, one end of which may be removably and sealably installed to a tip holder portion of a resistance welding device, while the opposite end is adapted to receive a weld electrode. The adapter is easy to install and remove, and is inexpensive to manufacture. Consequently, the adapter can be easily replaced as it wears.

Resistance welding is a commonly employed technique for joining metallic work pieces via electric current. There are several forms of resistance welding, including spot welding, seam welding, projection welding, and butt welding. However, all forms of resistance welding operate to join work pieces by causing the localized heating thereof. The localized heating is sufficient to produce a molten weld pool between the work pieces. Upon cooling, the weld pool forms a weld nugget that joins the work pieces.

As stated, it is necessary to generate heat to perform resistance welding. The amount of heat generated depends on several factors, including the electrical resistance and thermal conductivity of the components to be joined, and the time that the current is applied. As such, it is desirable to conduct the electric current used to produce this heat as efficiently as possible. Consequently, although other conductive metals may be used, copper is commonly utilized to form the current carrying components of a resistance welding device. These components may include, for example, a gun arm, a weld tip holder, a connecting adapter, and a weld electrode. The use of copper helps to facilitate the generation of enough heat to cause a localized melting of the work pieces to be joined. Copper also exhibits a high thermal conductivity in comparison to most other metals. The high conductivity of copper helps to prevent overheating of the welding device components by ensuring that the heat produced by the electric current is generated in the work pieces to be joined, instead of in the components of the welding device. Overheating of the weld electrodes, for example, can be detrimental to the appearance of the work piece surfaces, and can also cause degradation of the electrodes. Water or another fluid is also typically circulated through or around the interior of the weld electrodes to provide additional cooling.

Resistance welding also requires that the weld electrodes be held against the work pieces under force during the welding process. The electrical resistance across the interface of the electrodes and the work pieces is affected by the amount of force that is exerted against the work pieces by the electrodes. By knowing the material properties of the work pieces, the amount of force exerted by the electrodes can be adjusted to create substantially immediate heat at the interface between the work pieces. The amount of force is adjusted to provide sufficient contact for welding, while also ensuring that expulsion, or weld spatter is minimized.

While copper is an excellent material for efficiently transferring electrically-produced heat to the work pieces to be joined, it is also a soft material. Consequently, the various copper components of typical resistance welding devices are prone to wear and/or damage. For example, weld electrodes wear down during use as a result of heat generated by the welding process, and also due to the force they are required to exert against the work pieces upon which they operate. Consequently, in order to keep a weld electrode in satisfactory welding condition, the weld electrode is typically subjected to a periodic cutting or shaping process commonly referred to as "tip dressing".

Eventually, however, the weld electrode will wear beyond an acceptable limit, and must then be replaced. On many resistance welding devices, the process of electrode replacement involves removing the old electrode and installing a new electrode to a tip holder portion of the welding device. A weld electrode is commonly removed by force, such as with pliers, wrenches, hammers, or other similar tools suitable for dislodging the electrode from the tip holder. The tip holder/electrode design of a resistance welding device can vary considerably. For example, certain tip holders are designed with a female cavity that is designed to receive a shank portion of a connecting adapter or a specialized electrode having a protruding male shank. The connecting adapter or electrode may be tapped into the tip holder using a hammer, for example. Alternatively, the tip holder may be equipped with a protruding male portion, over the end of which may be placed an electrode. Again, the electrode may be installed using a hammer or similar tool. Under either of the above scenarios, however, the components are generally moderately force fit by employing tapered mating portions and taking advantage of the generally malleable nature of the copper material from which they are formed.

As can be surmised from the above description, due to the softness of the copper material, electrode replacement will eventually have a detrimental effect on the condition of the mating components of the resistance welding device. For example, in the above, former example, repeated removal/installation of connecting adapters or electrodes to/from the cavity in the weld tip holder will eventually lead to the deformation thereof. Similarly, repeated removal/installation of electrodes to/from the protruding male portion of weld tip holder in the above, latter example, will eventually lead to the deformation thereof, and to possible deformation of a larger portion of the tip holder as a result of repeated impact. Consequently, such components require periodic replacement.

One problem with known resistance welding devices is that there has been, heretofore, no easy, quick, and inexpensive way to replace such components. For example, when a tip holder equipped with an adapter/electrode receiving cavity needs to be repaired or replaced, the entire tip holder must generally be removed from the gun arm. Such a process can require a significant amount of time to accomplish, as the tip holder is typically attached to the gun arm by a number of fasteners. Additionally, there are generally cooling lines running through the gun arm and into the tip holder, so re-sealing must be ensured. Further, such a process can be expensive, as in addition to the cost associated with repair or replacement of the tip holder, a plurality of spare tip holders must be kept stocked and available.

Therefore, as can be discerned from the foregoing discussion, it is desirable to be able to attach a weld electrode to a resistance welding device in such a manner that removal/installation of the electrode can be accomplished in an efficient manner. It is also desirable that the means of attaching the electrode to the welding device be as inexpensive as possible, thereby providing for low cost replacement. The weld electrode connecting adapter of the present invention satisfies this need. The adapter of the present invention functions as a low cost means of facilitating quick and easy connection of a weld electrode to a resistance welding device. More specifically, one end of the adapter of the present invention may be sealably threaded into a tip holder portion of a resistance welding device. The opposite end of the adapter is designed to receive a weld electrode. The adapter is preferably made from copper, but other conductive materials may also be employed for its construction.

One embodiment of the adapter of the present invention is provided with parallel threads for threading into a corresponding threaded cavity in the tip holder portion of a resistance welding device. The adapter preferably has a passageway extending longitudinally therethrough to allow for the circulation of cooling water to the electrode. An o-ring may be provided in the vicinity of the threaded portion of the adapter to prevent leakage of cooling fluid from around the threads. Preferably, a receiving groove, or channel, is also provided in the receiving cavity of the tip holder to receive the o-ring and to provide a proper seal. The electrode receiving end of the adapter is preferably tapered to receive a like-tapered electrode. The adapter can generally be installed to a tip holder with a common wrench, although it may also be designed to require a specialized installation/removal tool. In certain embodiments, an electrode can be installed to the adapter in the normal fashion—by tapping it into position with a hammer or other acceptable tool.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 4b is cross-sectional view of the weld electrode connecting adapter shown in FIG. 4a;

DETAILED DESCRIPTION OF THE EXEMPLARY EMBODIMENT(S)

Figure 1A:
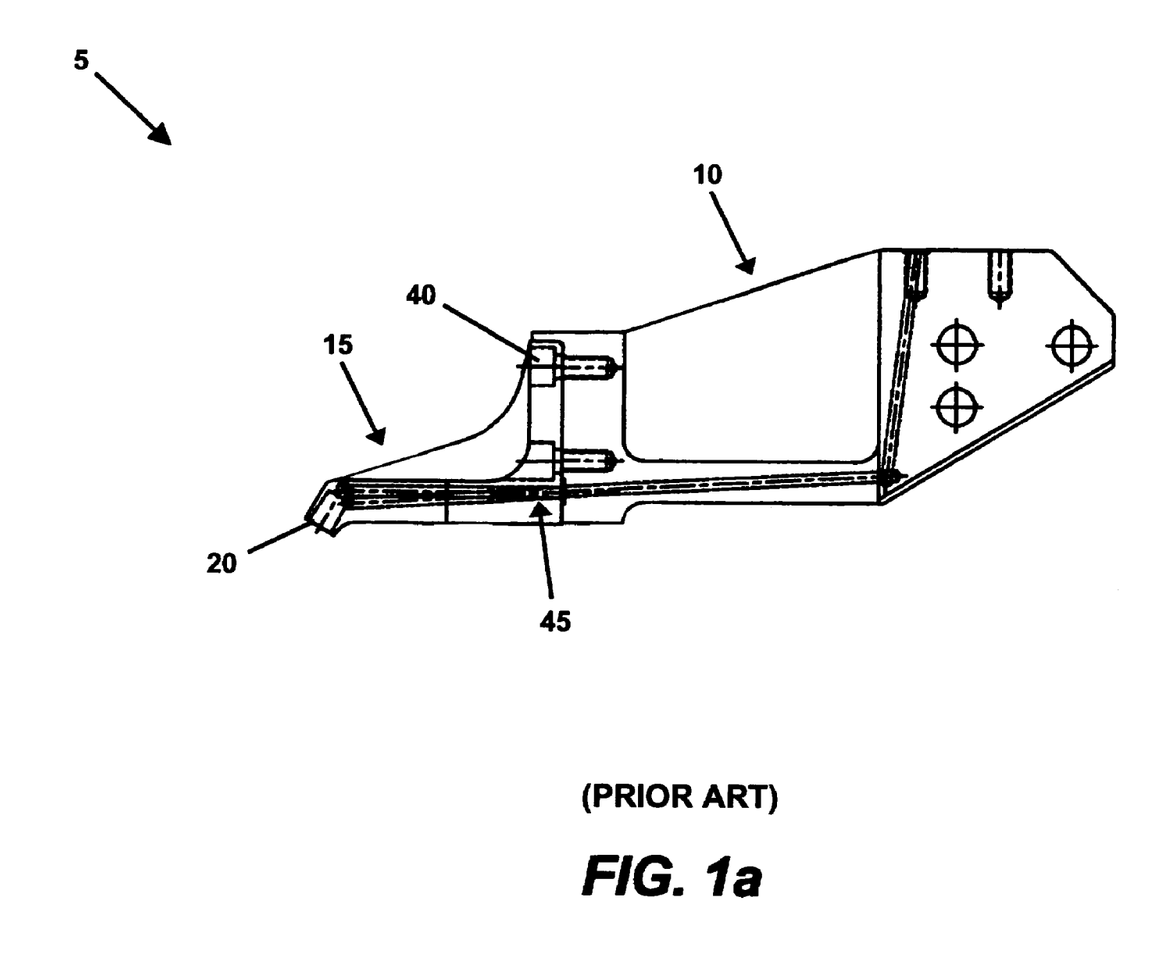
FIG. 1a illustrates a portion of one version of a known resistance welding assembly, wherein a tip holder is attached to a gun arm and is designed to receive a weld electrode connecting adapter having a male shank.
Figure 1B:
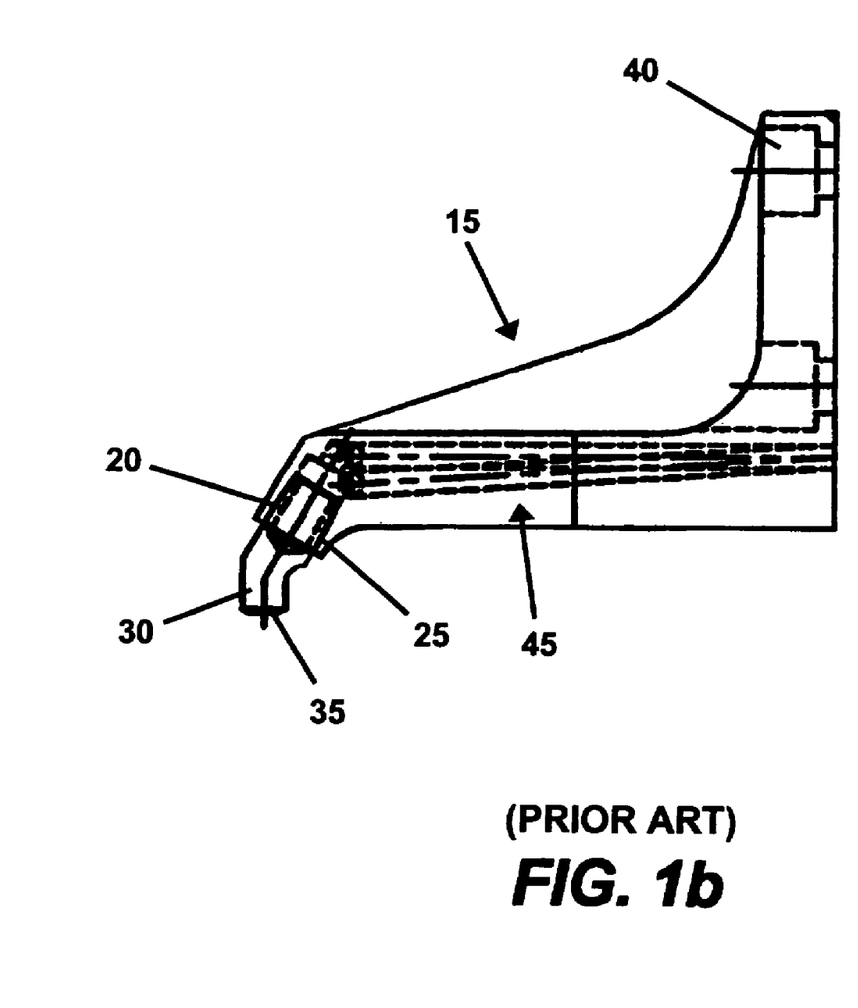
FIG. 1b is an enlarged view showing the tip holder of FIG. 1a with the weld electrode connecting adapter installed thereto.

A portion of a known resistance welding device 5 without, and with a connecting adapter 30 installed thereto, can be observed by reference to FIGS. 1a and 1b, respectively. As can be seen, the visible portion of the welding device 5 includes a gun arm 10, to which is affixed a tip holder 15. The tip holder 15 is provided with a receiving cavity 20. The receiving cavity 20 is designed to receive a shank portion of a specialized electrode or, more commonly, the shank portion 25 of a connecting adapter 30. The receiving cavity 20 and the shank portion 25 of the electrode or connecting adapter 30 are tapered to facilitate their assembly. Generally, the fit of the shank portion 25 into the receiving cavity 20 is a tight force fit, with the malleability of the copper allowing for secure retainment.

In operation, the connecting adapter 30 is installed to the tip holder 15 by tapping on the adapter until the shank portion 25 thereof is sufficiently driven into the tip holder's receiving cavity 20. The fit of the tapered shank portion 25 into the correspondingly tapered receiving cavity 20 retains the connecting adapter 30 thereto. A weld electrode (not shown) may be installed over the exposed end 35 of the connecting adapter 30 after it has been affixed to the tip holder 15. In a manner similar to that of installing the connecting adapter 30, the electrode is affixed to the connecting adapter by tapping it with a hammer or similar tool. Alternatively, it is possible to provide an electrode with an integral shank, whereby the electrode can be installed to the receiving cavity 20 of the tip holder 15 without the need for the connecting adapter 30.

Figure 2:
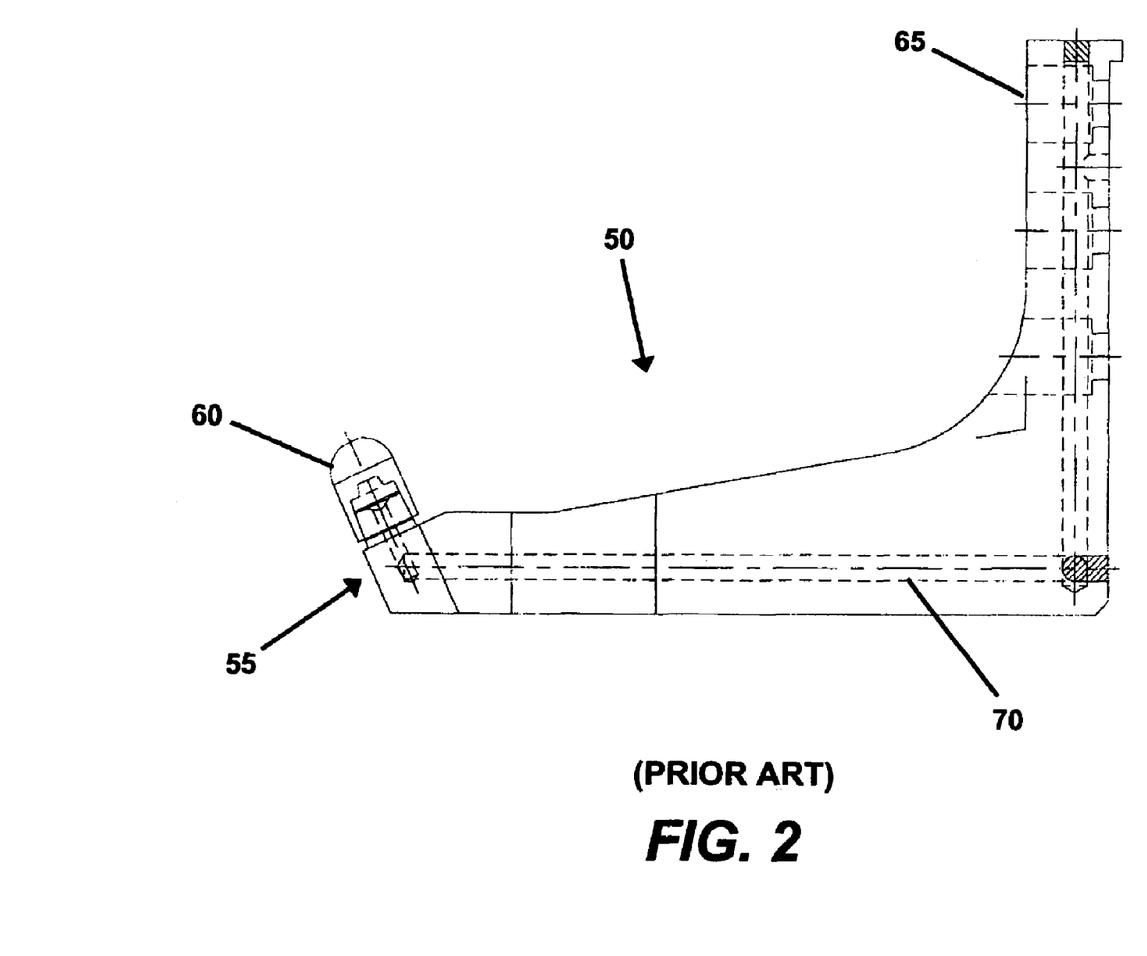
FIG. 2 illustrates another version of a known tip holder of a resistance welding assembly, wherein an electrode receiving portion is integral to the tip holder.

Another version of a known tip holder 50 is depicted in FIG. 2. In this embodiment, a weld electrode receiving portion 55 is integral to the tip holder 50. In operation, a weld electrode 60 may be installed over the end of weld electrode receiving portion 55. In a manner similar to that described above, the weld electrode 60 may be affixed to the weld electrode receiving portion 55 by tapping it with a hammer or similar tool.

With each of the above-described embodiments, however, it can be understood how damage to the individual components of the welding device generally results from the repeated installation and removal of electrodes and connecting adapters. For example, as previously discussed, electrodes must be periodically replaced. In the embodiment of FIGS. 1a–1b, this continual removal and replacement wears down the end of the copper connecting adapter 30 to which the electrodes are installed. Thus, eventually, the connecting adapter 30 must be replaced. Repeated removal and installation of connecting adapters 30 eventually degrades the condition of the receiving cavity 20. For example, the receiving cavity 20 will eventually become oversized and will no longer retain the connecting adapter 30 in a sufficient manner. Consequently, the receiving cavity 20 must be repaired, if possible. If the condition of the receiving cavity 20 is poor enough, repair may not be possible. In the embodiment of FIG. 2, this continual removal and replacement wears down the end of the weld electrode receiving portion 55. Because the weld electrode receiving portion 55 is integral to the tip holder 50, the tip holder must be replaced. Thus, in either case, the tip holder must be removed from the welding device and a spare tip holder must be installed. Such a process is time consuming, as the tip holder 15, 50 is typically attached to a gun arm 10 or other structure of the welding device by a number of fasteners 40, 65. Additionally, there are generally cooling lines 45, 70 running through the tip holder 15, 50, so re-sealing must be ensured. Further, such a process can be expensive. In addition to the cost associated with repair or replacement of the tip holder 15, 50, a plurality of spare tip holders must be kept stocked and available.

Figure 3A:
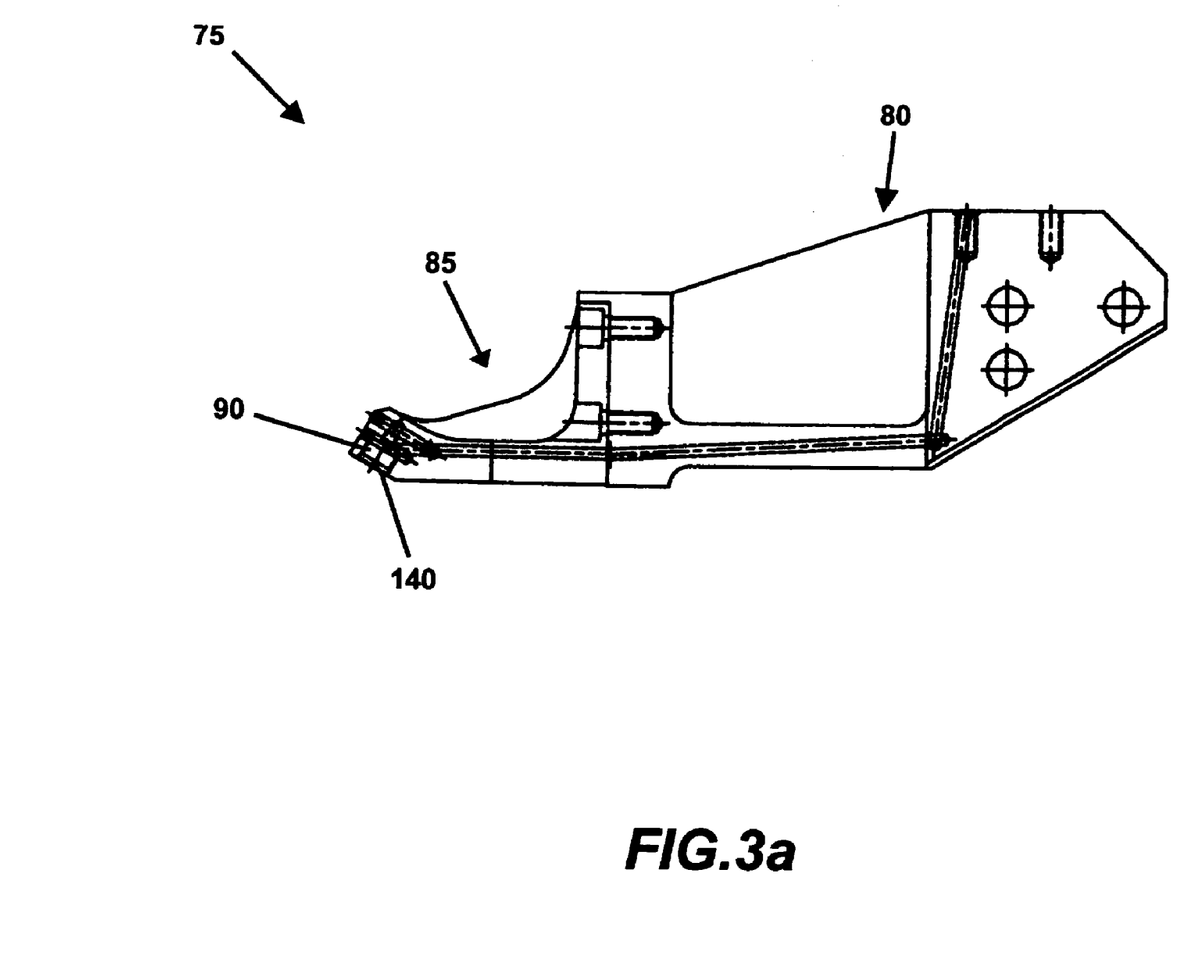
FIG. 3a shows a portion of a resistance welding assembly, wherein a tip holder is attached to a gun arm and is designed to receive one embodiment of a weld electrode connecting adapter of the present invention.
Figure 3B:
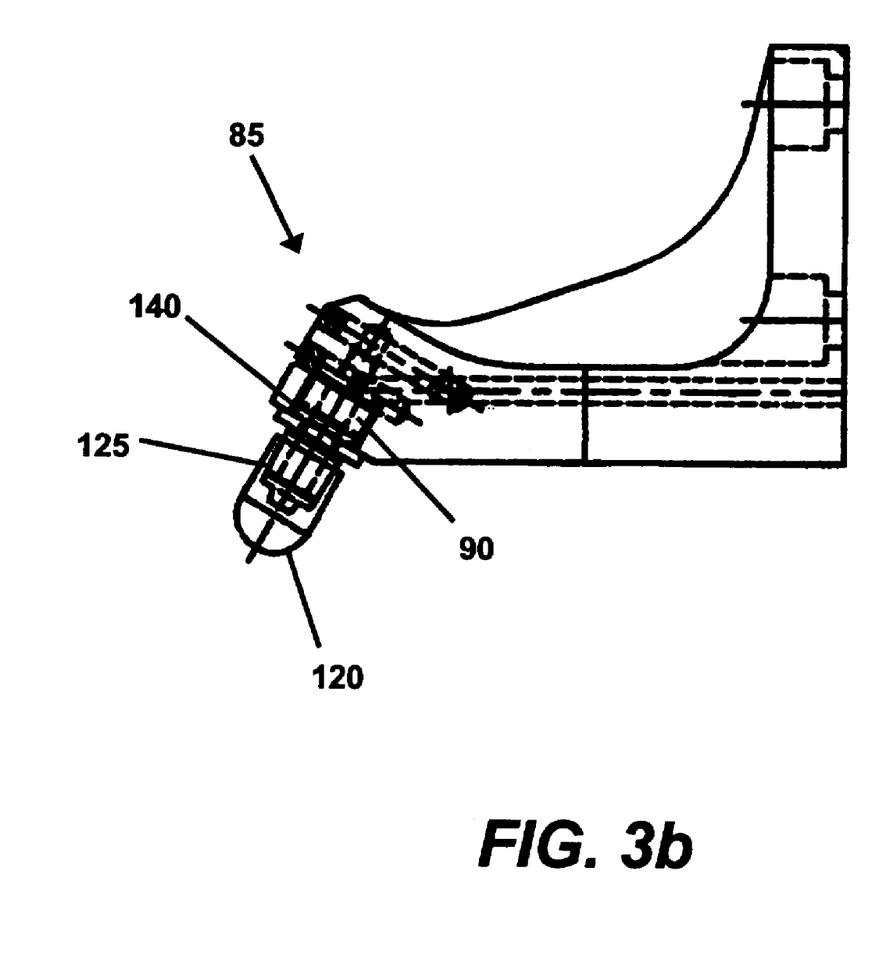
FIG. 3b is an enlarged view showing the tip holder of FIG. 3a with the weld electrode connecting adapter of the present invention installed thereto.
Figure 4A:
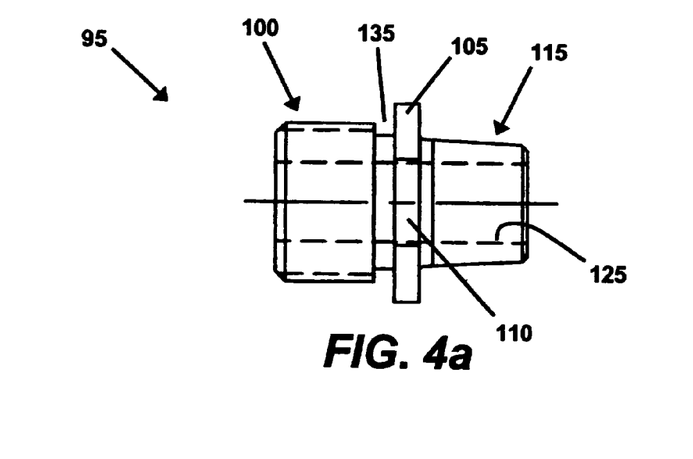
FIG. 4a is an enlarged side view of one embodiment of a weld electrode connecting adapter of the present invention.
Figure 4B:
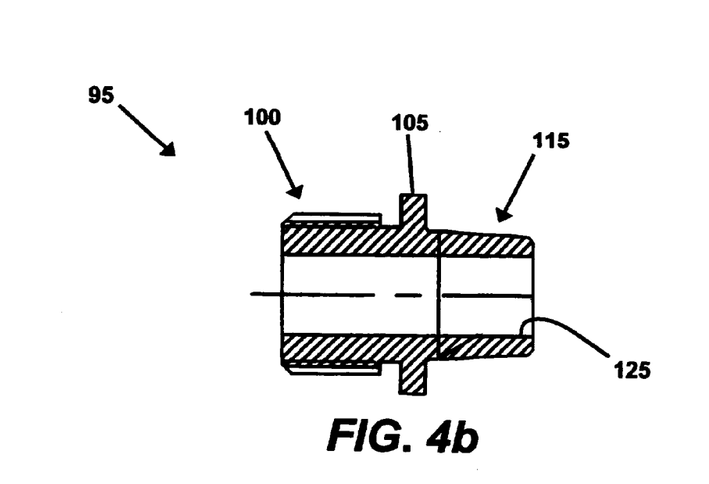
Figure 4C:
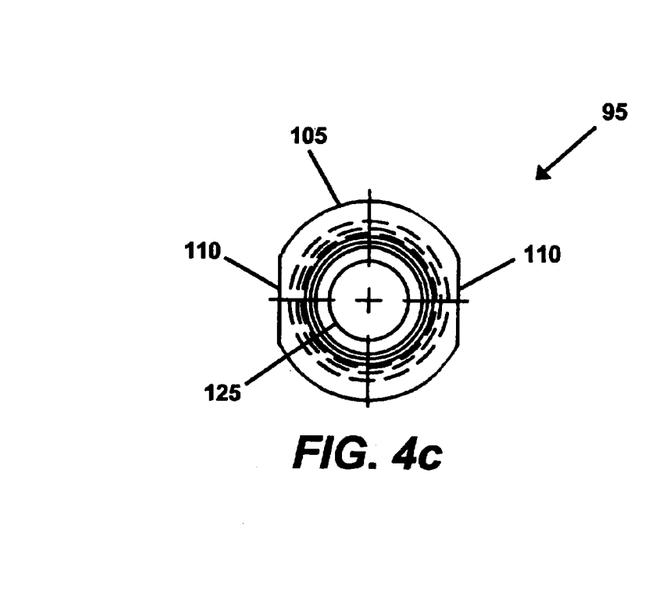
FIG. 4c is an end view of the weld tip holder adapter shown in FIGS. 4a and 4b, wherein the end of the weld electrode connecting adapter designed to receive a welding electrode is visible.
Figure 5:
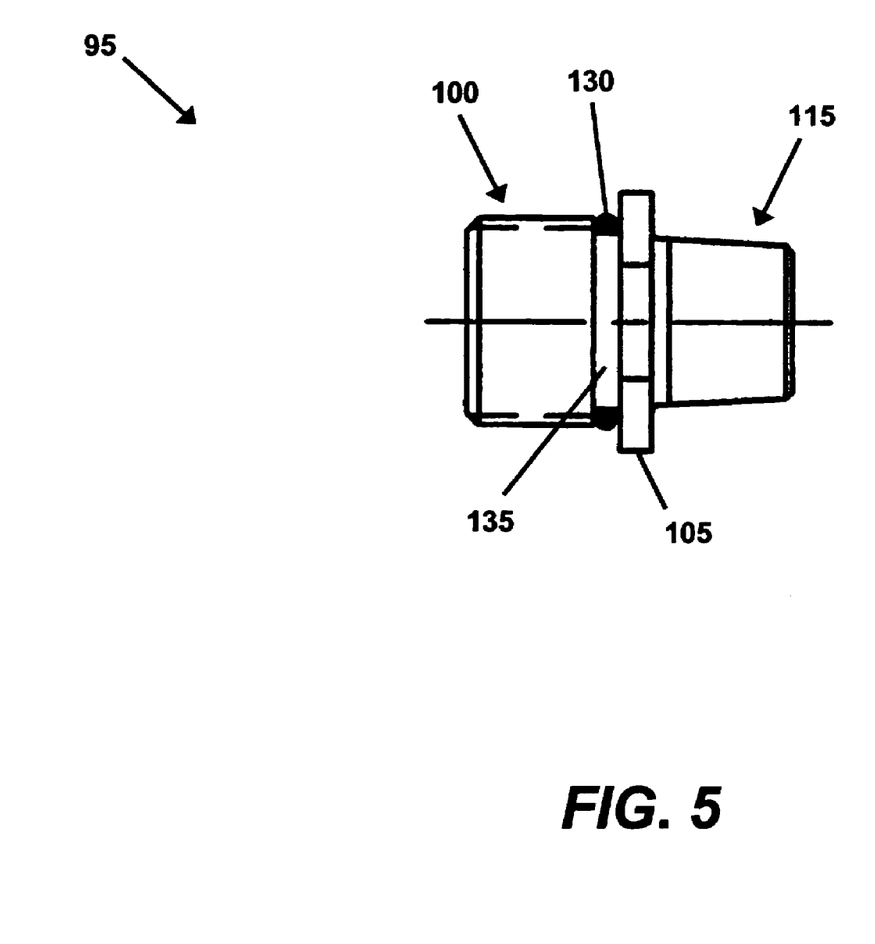
FIG. 5 is another view of the weld electrode connecting adapter of FIG. 4a, illustrating the proper positioning of an o-ring thereon.

A portion of a resistance welding device 75 without and with a weld electrode connecting adapter 95 (see FIGS. 3–4) of the present invention installed thereto can be observed by reference to FIGS. 3a and 3b, respectively. As can be seen, the visible portion of the welding device 75 includes a gun arm 80, to which is affixed a tip holder 85. The tip holder 85 is provided with a receiving cavity 90. The receiving cavity 90 is designed to receive a threaded end 100 of the weld electrode connecting adapter 95 of the present invention. In one exemplary embodiment of the present invention, the receiving cavity 90 is provided with parallel threads, such as, for example, a M16×1.5 thread. Of course, other types and sizes of threads may also be used. However, it has been found that parallel threads better allow the weld electrode connecting adapter 95 to be installed to the tip holder 85 under force, without causing damage to the receiving cavity 90. The threads may be right-handed or left-handed, to facilitate tip dressing.

One embodiment of a weld electrode connecting adapter 95 can be seen in FIGS. 3b–5. In this particular embodiment, the weld electrode connecting adapter 95 is shown to be a conductive body of substantially cylindrical shape, although portions of the weld electrode connecting adapter can also have other shapes. A first, threaded end 100 of the weld electrode connecting adapter 95 is designed to mate with the threads in the receiving cavity 90 of the tip holder 86. The weld electrode connecting preferably seats against the tip holder 85 when the weld electrode connecting adapter is properly installed thereto. In this particular embodiment of the weld electrode connecting adapter 95, flat areas 110 are cut into the flange 105 for receiving a wrench or other acceptable installation tool. The flange could also have a hexagonal, octagonal, or other common fastener shape that would allow for its manipulation by a wrench or socket, for example. If desired, slots, grooves or other tool mating features (not shown) may also be placed on the weld electrode connecting adapter 95 to receive a corresponding structure on a specialized weld electrode installation/removal tool. The design of the weld electrode connecting adapter 95 of the present invention allows it to be quickly and easily installed to the tip holder 85 of the welding device 75.

This exemplary embodiment of the weld electrode connecting adapter 96 is also preferably provided with a second, tapered end 115. The tapered end 115 is provided to receive a weld electrode 120 (see FIG. 3b) having a cavity 125 with a corresponding taper. The taper of the second end 116 of the weld electrode connecting adapter 95 allows the weld electrode 120 to be more easily installed thereto. For example, the weld electrode 120 may simply be tapped onto the tapered end 115 of the weld electrode connecting adapter 95 using a hammer or other similar tool. The taper of the second end 115 of the weld electrode connecting adapter 95 also allows the weld electrode 120 to be more easily removed therefrom. For example, the weld electrode 120 may be removed from the weld electrode connecting adapter 95 with pliers, a wrench, or by tapping on the weld electrode from the backside thereof. It is also possible to provide the second end 115 of the weld electrode connecting adapter 95 with a different structure, if necessary to mate with a particular weld electrode.

The weld electrode connecting adapter 95 of the present invention also preferably has a passageway, such as a bore of some diameter, passing therethrough. In the embodiment shown in FIGS. 3b–4c, a bore 125 can be seen to run axially through the weld electrode connecting adapter 95. The bore 125 is provided to circulate cooling fluid to the interior of the weld electrode 120. The cooling fluid is provided to prevent the temperature of the weld electrode 120 from exceeding a predetermined level as a result of the welding process. The bore 125 is shown to be in communication with cooling lines that run internally through the gun arm 80 and tip holder 85 of the welding device 75. In other embodiments, the bore 125 of weld electrode connecting adapter 95 may be in communication with cooling lines that are substantially external to the welding device. It has been found that decreasing the size of the passageway and, thus, increasing the wall thickness of the adapter, can increase the adapter's service life while still permitting adequate cooling of the weld electrode.

To aid in preventing leakage of cooling fluid from around the threaded end 100 of the weld electrode connecting adapter 95, an o-ring 130 (see FIG. 4) is preferably employed. A first o-ring groove 135 is preferably provided around the circumference of the weld electrode connecting adapter 95, between the threads of the threaded end 100 and the flange 105, to retain the o-ring on the weld electrode connecting adapter. A second o-ring groove 140 is preferably located within the receiving cavity 90 of the tip holder 85 to provide a sealing surface for the outside of the o-ring 130. Therefore, when the weld electrode connecting adapter 95 of the present invention is properly installed to the tip holder 85, cooling fluid will be properly routed to the interior of the weld electrode 120 without leakage thereof from around the threaded portion 100 of the weld electrode connecting adapter.

The weld electrode connecting adapter 95 of the present invention may consist essentially of copper. However, it is contemplated that other electrically and thermally conductive materials can also be used to form the weld electrode connecting adapter 95. For example, in addition to copper, it is contemplated that the weld electrode connecting adapter 95 of the present invention may be manufactured from a material such as aluminum or silver. In this manner, it can be best ensured that heat will be generated in the work pieces to be joined, instead of in the weld electrode 120. Consideration must also be given, of course, to the connection of welding device components of dissimilar materials. It may also be possible to coat the weld electrode connecting adapter 95 in order to improve its electrical and/or thermal conductivity.

As can be understood from the foregoing description, the weld electrode connecting adapter of the present invention can be quickly and easily installed to the tip holder of a welding device. The ease of installation allows for reduced downtime and, therefore, a reduction in the costs associated with lost production. Further, the threaded design of the weld electrode connecting adapter substantially reduces or even eliminates damage to the tip holder as a result of repeatedly changing weld electrodes. Thus, the weld electrode connecting adapter of the present invention can also lower the repair and maintenance costs commonly associated with a typical resistance welding device. Because the electrode receiving end of the weld electrode connecting adapter, rather than the tip holder itself, will experience wear as a result of electrode replacement, tip holder repair/replacement can be substantially reduced. This can result in a considerable cost savings, as replacement of the weld electrode connecting adapter should be significantly less expensive than the repair or replacement of a tip holder. Additionally, a reduced number of replacement tip holders can be maintained, leading to a reduction in inventory costs.

While certain embodiments of the present invention are described in detail above, the scope of the invention is not to be considered limited by such disclosure, and modifications are possible without departing from the spirit of the invention as evidenced by the following claims:

What is claimed is:

1. An adapter for connecting a weld electrode to a tip holder of a welding device, comprising:
   a conductive body of some length having a first end and a second end;
   a threaded portion located on said first end of said conductive body and adapted to releasably engage a like-threaded receiving cavity in said tip holder;
   a taper located on said second end of said conductive body, said taper increasing in the direction of said first end and adapted to receive a weld electrode;
   a flange located between said first end and said second end, said flange extending outward from said conductive body and adapted to seat against a mating surface of said tip holder when said threaded portion of said first end is properly engaged with said receiving cavity in said tip holder;
   a longitudinally oriented passageway through said conductive body, said passageway for transporting cooling fluid;
   an o-ring grove oriented substantially transverse to the longitudinal axis of said conductive body and extending around the perimeter thereof, said o-ring groove located between said threaded portion and said flange;
   an o-ring located in said o-ring groove, said o-ring for engaging a groove in said receiving cavity of said tip holder, thereby providing for sealable engagement therewith; and
   a means for allowing rotational manipulation of said conductive body.

2. The adapter of claim 1, wherein said conductive body is manufactured from an electrically and thermally conductive material.

3. The adapter of claim 2, wherein said conductive body consists essentially of copper.

4. The adapter of claim 3, wherein said conductive body is coated with silver.

5. The adapter of claim 1, wherein said electrically and thermally conductive material is aluminum.

6. The adapter of claim 1, wherein said threaded portion consists of parallel threads.

7. The adapter of claim 1, wherein said tapered end removably engages an interior portion of said weld electrode.

8. The adapter of claim 7, wherein said weld electrode is secured to said tapered end by means of a force fit.

9. The adapter of claim 1, wherein said flange is adapted to reside against a portion of said tip holder when said conductive body is properly threaded into said receiving cavity.

10. The adapter of claim 9, wherein said flange assists in preventing leakage of cooling fluid from around said threaded portion.

11. The adapter of claim 1, wherein said means for allowing rotational manipulation of said conductive body consists of a pair of opposing flat areas on said flange, said flat areas for allowing engagement with a wrench.

12. The adapter of claim 1, wherein said means for allowing rotational manipulation of said conductive body consists of a hexagonal or octagonal shaped flange that allows for engagement by a wrench or socket.

13. The adapter of claim 1, wherein said means for allowing rotational manipulation of said conductive body consists of a structure designed to engage with a specialized adapter installation and/or removal tool.

14. An adapter for connecting a weld electrode to a tip holder of a resistance welding device, comprising:
   an electrically and thermally conductive body of some length, said conductive body having a first end and a second end;
   parallel threads located on said first end of said conductive body and adapted to releasably engage a like-threaded receiving cavity in said tip holder;
   a taper located on said second end of said conductive body, said taper increasing in the direction of said first end and adapted to securely mate with an interior portion of a weld electrode;
   a flange located between said first end and said second end of said conductive body, said flange extending outward from said conductive body in a direction substantially transverse to the longitudinal axis thereof and adapted to abut a mating surface of said tip holder when said threaded portion of said first end is properly engaged with said receiving cavity in said tip holder;
   a longitudinally oriented passageway through said conductive body, from said first end to said second end, said passageway for transporting cooling fluid to said interior portion of said electrode;
   an o-ring groove oriented substantially transverse to the longitudinal axis of said conductive body and extending around the perimeter thereof, said o-ring groove located between said parallel threads and said flange;
   an o-ring located in said o-ring groove, said o-ring protruding from said o-ring groove an amount sufficient to abut the surface of a groove in said receiving cavity of said tip holder, thereby providing for sealable engagement therewith; and
   a structure on said conductive body for allowing engagement by an installation and/or removal tool, thereby allowing for rotational manipulation of said conductive body by said tool;
   whereby weld electrodes can be repeatedly installed to and removed from said second end of said conductive body after its installation to said tip holder, without damage to said tip holder.

15. The adapter of claim 14, wherein said conductive body consists essentially of copper.

16. The adapter of claim 14, wherein said conductive body is coated with silver.

17. The adapter of claim 14, wherein said conductive body consists essentially of aluminum.

18. The adapter of claim 15, wherein said weld electrode is secured to said tapered end by means of a force fit.

19. The adapter of claim 14, wherein said flange is adapted to reside against a portion of said tip holder when said conductive body is properly threaded into said receiving cavity.

20. The adapter of claim 19, wherein said flange assists in preventing leakage of cooling fluid from around said threads.

21. The adapter of claim 14, wherein said structure on said conductive body for allowing engagement by an installation and/or removal tool consists of a pair of opposing flat areas on said flange.

22. The adapter of claim 14, wherein said structure on said conductive body for allowing engagement by an installation and/or removal tool consists of a hexagonal or octagonal shaped flange that allows for engagement by a wrench or socket.

23. The adapter of claim 14, wherein said structure on said conductive body for allowing engagement by an installation and/or removal tool is uniquely designed to be engageable only by a specialized tool.

24. An adapter for connecting a weld electrode to a tip holder of a resistance welding device, comprising:
- an electrically and thermally conductive body of some length, said conductive body having a first end and a second end;
- parallel threads located on said first end of said conductive body and adapted to releasably engage a like-threaded receiving cavity in said tip holder;
- a taper located on said second end of said conductive body, said taper increasing in the direction of said first end and adapted to securely mate with an interior portion of a weld electrode;
- a flange located between said first end and said second end of said conductive body, said flange extending outward from said conductive body in a direction substantially transverse to the longitudinal axis thereof and adapted to abut a mating surface of said tip holder when said threaded portion of said first end is properly engaged with said receiving cavity in said tip holder;
- a longitudinally oriented passageway through said conductive body, from said first end to said second end, said passageway for transporting cooling fluid to said interior portion of said electrode;
- an o-ring groove oriented substantially transverse to the longitudinal axis of said conductive body and extending around the perimeter thereof, said o-ring groove located between said parallel threads and said flange; and
- an o-ring located in said o-ring groove, said o-ring protruding from said o-ring groove an amount sufficient to abut the surface of a groove in said receiving cavity of said tip holder, thereby providing for sealable engagement therewith;
- wherein said flange is adapted to be engaged by an installation and/or removal tool, thereby allowing for rotational manipulation of said conductive body by said tool; and
- whereby the threaded engagement between said first end of said conductive body and said tip holder prevents impact forces imparted to said conductive body during installation of a weld electrode thereto from damaging said tip holder.

* * * * *

UNITED STATES PATENT AND TRADEMARK OFFICE
CERTIFICATE OF CORRECTION

PATENT NO.    : 7,022,934 B1                                      Page 1 of 1
DATED         : April 4, 2006
INVENTOR(S)   : Pratt It is certified that error appears in the above-identified patent and that said Letters Patent is hereby corrected as shown below:

Column 5,
Lines 43-44, delete "weld electrode connecting adapter 96" and insert -- weld electrode connecting adapter 95 --.

Column 5,
Line 47, delete "taper of the second end 116" and insert -- taper of the second end 115 --.

Signed and Sealed this

Thirteenth Day of June, 2006

JON W. DUDAS
*Director of the United States Patent and Trademark Office*